United States Patent
Rannoux et al.

(10) Patent No.: US 10,260,018 B2
(45) Date of Patent: Apr. 16, 2019

(54) EPILAMIZATION METHOD OF AN ELEMENT OF A TIMEPIECE OR PIECE OF JEWELLERY

(71) Applicant: The Swatch Group Research and Development Ltd, Marin (CH)

(72) Inventors: Claire Rannoux, Morges (CH); Christophe Letondor, Le Landeron (CH); Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/786,841

(22) Filed: Oct. 18, 2017

(65) Prior Publication Data
US 2018/0112144 A1    Apr. 26, 2018

(51) Int. Cl.
| | | |
|---|---|---|
| *G06F 17/30* | (2006.01) | |
| *G06F 11/14* | (2006.01) | |
| *C10M 107/38* | (2006.01) | |
| *A44C 27/00* | (2006.01) | |
| *B01J 10/00* | (2006.01) | |
| *B01J 19/00* | (2006.01) | |
| *B01L 1/02* | (2006.01) | |
| *B05D 5/08* | (2006.01) | |
| *B05D 1/00* | (2006.01) | |
| *C10N 40/00* | (2006.01) | |

(52) U.S. Cl.
CPC ......... *C10M 107/38* (2013.01); *A44C 27/007* (2013.01); *B01J 10/00* (2013.01); *B01J 19/0073* (2013.01); *B01L 1/02* (2013.01); *B05D 1/60* (2013.01); *B05D 5/083* (2013.01); *B01L 2300/04* (2013.01); *B01L 2300/14* (2013.01); *C10M 2211/06* (2013.01); *C10N 2040/00* (2013.01); *C10N 2230/00* (2013.01)

(58) Field of Classification Search
CPC .............................. A44C 27/007; B01J 10/00
See application file for complete search history.

(56) References Cited

U.S. PATENT DOCUMENTS

| 2,897,778 A | 8/1959 | Held et al. |
| 7,191,787 B1* | 3/2007 | Redeker ................... B08B 3/12 134/105 |
| 2006/0065288 A1* | 3/2006 | Babic .................... B08B 7/0021 134/2 |
| 2010/0323527 A1 | 12/2010 | Roberts et al. |
| 2012/0088099 A1 | 4/2012 | Tosatti et al. |
| 2015/0103639 A1* | 4/2015 | Portet ...................... B05D 1/34 368/286 |
| 2016/0272749 A1* | 9/2016 | Letondor ............. C10M 107/38 |
| 2016/0272842 A1 | 9/2016 | Letondor et al. |

FOREIGN PATENT DOCUMENTS

| CH | 286867 | 11/1952 |
| DE | 10 2013 226 215 A1 | 6/2015 |
| EP | 3 070 133 A1 | 9/2016 |
| WO | WO 2007/013881 A2 | 2/2007 |
| WO | WO 2013/167624 A1 | 11/2013 |

OTHER PUBLICATIONS

European Search Report dated Apr. 13, 2017 in European Application 16195445.8, filed on Oct. 25, 2016 (with English Translation of Categories of cited documents).

* cited by examiner

*Primary Examiner* — Dah-Wei D. Yuan
*Assistant Examiner* — Kristen A Dagenais
(74) *Attorney, Agent, or Firm* — Oblon, McClelland, Maier & Neustadt, L.L.P.

(57) ABSTRACT

The invention relates to a method for epilamization of at least one portion of a substrate surface comprising the steps of:
   a) preparing an epilame agent
   b) optionally, preparing the substrate surface
   c) placing the substrate and the epilame agent in a chamber at ambient pressure
   d) introducing $CO_2$ into the hermetically sealed chamber at a pressure comprised between 25 bar and 74 bar and at a temperature comprised between 10° C. and 80° C. for a duration comprised between 1 minute and 30 minutes,
   e) reducing the pressure in the chamber, and
   f) removing the epilamized substrate from the chamber.

16 Claims, No Drawings

EPILAMIZATION METHOD OF AN ELEMENT OF A TIMEPIECE OR PIECE OF JEWELLERY

This application claims priority from European patent application No. 16195445.8 filed Oct. 25, 2016, the entire disclosure of which is hereby incorporated herein by reference.

FIELD OF THE INVENTION

The present invention relates to the field of mechanics and in particular to the field of horology or jewelry. It more particularly concerns a method for epilamization of at least one portion of a surface of a substrate present in a timepiece or piece of jewelry.

BACKGROUND OF THE INVENTION

There are various methods for modifying the surface state of a substrate through a treatment using an appropriate agent to specifically improve certain surface properties. For example, in the field of mechanics, and in particular in the field of horology, but also in the field of jewelry, epilamization of a surface of a piece or of an element is often achieved by means of an epilame agent to control and reduce the surface energy of said surface during use. More specifically, the purpose of an epilame agent is to prevent the spread of oil or lubricants over the elements of a timepiece or piece of jewelry by forming an invisible, hydrophobic and oleophobic molecular layer at the surface of the element allowing the lubricant to remain in a predetermined place on the treated surface and thereby prevent it from spreading. Keeping the lubricant in its operating area increases its durability.

Currently, most epilame agents available on the market, such as Moebius® Fixodrop® FK/BS or the 3M™ Fluorad™ range (FC-722 and others), consist of a fluoropolymer dissolved in a perfluorinated or fluorinated solvent. The epilamization method is conventionally achieved by dip coating the components to be epilamized in an epilame bath formed of a perfluorinated or fluorinated solvent loaded with epilame agent.

The most commonly used fluorinated solvents until recently were tetradecafluorohexane and 3M™ HFE-7100. However, tetradecafluorohexane has, in particular, the drawback of forming, once evaporated, a greenhouse effect gas, since it remains air-stable for 3,200 years and has a global warming potential of 7,400 $CO_2$ equivalents.

Since the use of such solvents has been prohibited by new environmental regulations, new fluorinated solvents have been developed. However, although these new-generation fluorinated solvents (such as 3M™ HFE-7200) are less stable in air, they still have an impact on the environment. They therefore require the use of machines or other closed equipment and are likely to be affected by even more strict regulations in the future. Further, these new-generation fluorinated solvents are relatively expensive.

To replace the conventional epilamization method using toxic and expensive fluorinated solvents, EP Patent Application 1927648 proposes an epilamization method with an epilame molecule solution in a mixture of water and propanol. This epilamization method has the drawback of only being able to be used with a very limited number of epilame agents since the epilame molecules must be soluble in the water/propanol mixture. However, it is well known to those skilled in the art that the best epilame properties are obtained with fluorinated molecules which therefore have very low solubility in a water/propanol mixture.

Finally, the concentrations of epilame agent used in the conventional dip coating epilamization method are very low (typically comprised between 20 mg/L and 250 mg/L) and the fluorinated solvents used are volatile (boiling temperature lower than 100° C.). Consequently, the day-to-day industrial management of epilame baths is complex because the concentration of epilame agent in the epilame bath has to be checked by titration and a concentrated solution of epilame agent or solvent must be added according to changes in the composition of the epilame bath.

SUMMARY OF THE INVENTION

It is an object of the invention to overcome the various drawbacks of known epilamization methods.

More precisely, it is an object of the invention to provide a new epilamization method making it possible to obtain epilamization of identical or higher quality than that obtained with a conventional dip coating epilamization method.

It is also an object of the invention to provide a new environmentally friendly epilamization method obviating the use of a large quantity of toxic fluorinated solvents.

It is also an object of the invention to provide a new economical epilamization method obviating the use of a large quantity of expensive fluorinated solvents.

It is also an object of the invention to provide a new epilamization method making it possible to simplify the daily management of epilame baths.

To this end, the invention concerns a method for epilamization of at least one portion of a substrate surface, comprising the steps of:
a) preparing an epilame agent
b) optionally, preparing the substrate surface
c) placing the substrate and the epilame agent in a chamber at ambient pressure
d) introducing $CO_2$ into the hermetically sealed chamber at a pressure comprised between 25 bar and 74 bar and at a temperature comprised between 10° C. and 80° C. for a duration comprised between 1 minute and 30 minutes
e) reducing the pressure in the chamber, and
f) removing the epilamized substrate from the chamber.

According to the invention, the $CO_2$ is used in a form close to supercritical conditions to convey the epilame agent and achieve the deposition of an invisible, hydrophobic and oleophobic molecular layer of said epilame agent. Thus, the method according to the invention drastically reduces or obviates the use of fluorinated solvents, so that the method of the invention is environmentally friendly and economical, while maintaining the epilame quality.

DETAILED DESCRIPTION OF THE INVENTION

The epilamization method concerns the deposition of a layer of an epilame agent on the surface of a substrate generally belonging to an element of a timepiece or of a piece of jewelry intended to be in contact with a lubricating agent. The layer of epilame agent forms an invisible, hydrophobic and oleophobic molecular layer, avoiding the spread of lubricant.

According to the invention, the method for epilamization of at least one portion of a surface of said substrate comprises the steps of:

a) preparing an epilame agent
b) optionally, preparing the substrate surface
c) placing the substrate and the epilame agent in a chamber at ambient pressure, i.e. a pressure comprised between 0.6 bar and 1.1 bar, and hermetically sealing the chamber
d) introducing $CO_2$ into the hermetically sealed chamber at a pressure comprised between 25 bar and 74 bar, preferably between 45 bar and 70 bar, and more preferentially between 50 bar and 60 bar, and at a temperature comprised between 10° C. and 80° C., and preferably between 25° C. and 60° C., and more preferentially between 30° C. and 50° C., for a duration comprised between 1 minute and 30 minutes, preferably between 1 minute and 20 minutes, and more preferentially between 3 minutes and 15 minutes.
e) reducing the pressure in the chamber, and
f) removing the epilamized substrate from the chamber.

In general, according to step b), the substrate surface must be carefully cleaned prior to epilamization so that it is perfectly clean. Any suitable surface preparation treatments known to those skilled in the art may be used. However, advantageously, step b) may comprise a $CO_2$ surface treatment of the substrate at a temperature comprised between 10° C. and 80° C. and a pressure comprised between 25 bar and 250 bar, for a duration comprised between 1 minute and 60 minutes. Such a treatment makes it possible, in particular, to eliminate dust particles and grease from the surface. Advantageously, the treatment in step b) is performed in the same chamber as that used for step d), which allows the different steps of the invention to be performed one after the other, avoiding any handling of the components. In such case, the chamber in which the substrate was placed is closed for implementation of step b), then opened to place the epilame agent inside in step c), then closed again for implementation of step d).

In a particularly advantageous manner, any known epilame agent can be used in the method of the invention. Preferably, the epilame agent is a fluorinated polymer, and advantageously, the epilame agent is chosen from the group of epilame agents described in EP Patent Application 3070133 by the same Applicant. This choice advantageously produces an epilame film that is resistant to watchmakers' cleaning.

In a first embodiment, the epilame agent may be placed in the chamber in a pure form.

In a second embodiment, the epilame agent may be placed in the chamber in the form of a solution in a solvent. According to the chamber volume and $CO_2$ pressure, a suitable volume and concentration of the epilame agent solution will be determined to produce a concentration of epilame agent in the solvent/$CO_2$ mixture comprised between 10 mg and 5 g per 1000 g of mixture ($CO_2$+solvent), preferably between 50 mg and 1 g per 1000 g of mixture ($CO_2$+solvent), even more preferentially between 100 mg and 500 mg per 1000 g of mixture ($CO_2$+solvent).

Preferably, said solvent is an organic solvent, preferably a fluorinated solvent, and more preferentially a perfluoroolefin.

Consequently, when the epilame agent is in solution in a fluorinated solvent, the quantity of fluorinated solvent implemented in the method of the invention is very small compared to the quantity used for a conventional epilame bath.

Preferably, the reduction in pressure in the chamber in step e) occurs slowly, in a duration comprised between a few seconds and several minutes, for example between 5 seconds and 10 minutes. Advantageously, the $CO_2$ is recovered and recycled. Advantageously, the epilame agent is recovered and reused for epilamization of a subsequent batch.

Preferably, the epilamization method according to the invention further comprises, between steps e) and f), an additional heat treatment step g) of the epilamized substrate. For example, the epilamized substrate is heated in the chamber to a temperature comprised between 30° C. and 80° C. for a duration comprised between 2 minutes and 30 minutes. Such a heat treatment improves the adhesion of the epilame agent to the surface of the substrate treated.

Advantageously, the substrate surface, at least part of which is coated with epilame agent, is made of a material chosen from the group comprising metals, metal oxides, polymers, sapphire, ruby, silicon, silicon oxides, silicon nitrides, silicon carbides, DLC (Diamond like carbon), and their alloys.

More specifically, the substrate surface may be made of steel, of noble metals such as gold, rhodium, palladium, platinum, or doped or undoped metal oxides of aluminium, zirconium, titanium, chromium, manganese, magnesium, iron, nickel, copper, zinc, molybdenum, silver, tungsten and their alloys, or of polyoxymethylene or acrylamide.

The method according to the invention makes batch treatment of components possible. Further, all the different steps can be performed in the same chamber, which avoids unnecessary handling. The method according to the invention obviates the use of an epilame bath made of expensive and toxic fluorinated solvent, and further obviates monitoring of the epilame bath. It is therefore environmentally friendly, economical and easy to implement. Further, the method according to the invention makes it possible to obtain an epilame quality that is at least identical to that obtained with a conventional dip coating epilamization method. In particular, the substrates treated according to the method of the invention do not have any residual trace of epilame agent, the effectiveness of the epilame agent is similar and the resistance to cleaning of the deposited epilame is at least identical.

The following examples illustrate the present invention without thereby limiting its scope.

There is used as epilame agent a compound described in EP Patent 3070133 by the same Applicant.

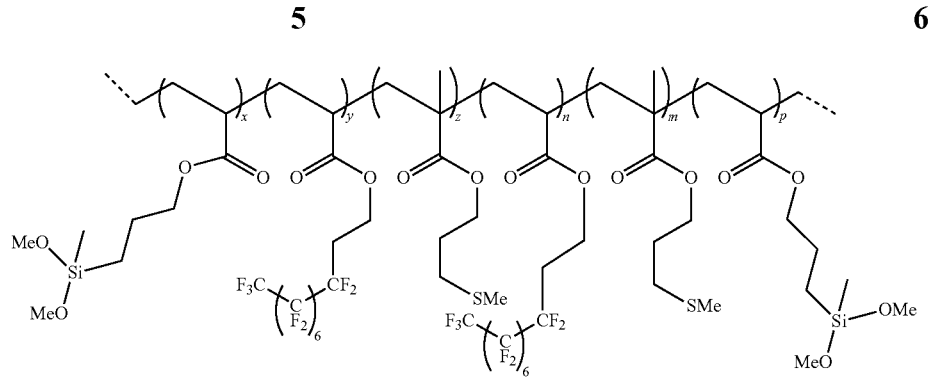

Procedures Used:

PREPARATION OF SUBSTRATES

Prior to the epilame treatment, different types of substrates are cleaned using standard watchmakers' methods. More specifically, the parts are cleaned with a Rubisol solution in the presence of ultrasound, rinsed several times with isopropyl alcohol, and then dried in hot air.

Epilame Treatment of Substrates According to the Invention ($CO_2$-Assisted):

According to the invention, there is introduced into an autoclave (255 ml):

substrates of a different nature to be epilamized
30 ml of a 1 g/L epilame agent solution in Vertrel Suprion The autoclave is closed, then 225 ml of $CO_2$ at a pressure of 55 bars and at a temperature of 40° C. is introduced into the autoclave. The epilamization time is set at 10 minutes, then the autoclave is slowly depressurized (depressurization time 40 seconds) and heated to 65° C. for 15 minutes. Finally, the epilamized substrates are retrieved and analysed.

COMPARATIVE EXAMPLE EPILAMIZATION BY DIP COATING

The substrates are epilamized by immersion (around 5 minutes) in a solution of the epilame agent (structure indicated above) (solvent: 250 mg/L DuPont™ Vertrel® Suprion™) and then dried in hot air.

Effectiveness and Property of Epilamization:

Aesthetic Appearance:

Substrates epilamized according to the method of the invention ($CO_2$ assisted) and the comparative method (dip coating) are visually checked. In both cases, the epilame film is invisible.

Angles of Contact:

The effectiveness of the epilame agent is evaluated by depositing drops of lubricant: MOEBIUS 9010 oil. The angle of contact between the substrates and the lubricant was measured on a DataPhysics OCA measuring instrument.

The results were as follows:

|                       | Substrates |       |      |    |    |                       |
|-----------------------|------------|-------|------|----|----|-----------------------|
| Epilamization method  | Sapphire   | Steel | Gold | Ni | Rh | Methylene polyoxide   |
| $CO_2$ assisted (inv.)| 85         | 86    | 87   | 84 | 82 | 84                    |
| Dip coating (comp.)   | 81         | 83    | 85   | 78 | 78 | 87                    |

Resistance to Cleaning

The resistance to cleaning of the epilame agents was evaluated after 3 successive cleaning operations (standard watchmakers' cleaning with a Rubisol solution) of the epilamized parts.

The results are as follows

|                       | Substrates |       |      |    |    |                       |
|-----------------------|------------|-------|------|----|----|-----------------------|
| Epilamization method  | Sapphire   | Steel | Gold | Ni | Rh | Methylene polyoxide   |
| $CO_2$ assisted (inv.)| 78         | 83    | 83   | 70 | 65 | 85                    |
| Dip coating (comp.)   | 77         | 82    | 78   | 48 | 71 | 73                    |

CONCLUSION

The above results show that the angles of contact obtained just after epilamization and after three watchmaker's cleaning operations with 9010 oil are comparable in the method of the invention ($CO_2$ assisted) and the comparative method (dip coating). In some cases (Ni or POM substrates), the resistance to cleaning of the epilame agent is even slightly superior when the latter is deposited by the method of the invention. This shows that the dip coating method, which uses a large quantity of solvent, can advantageously be replaced by a $CO_2$ assisted epilamization method according to the invention, which is environmentally friendly and economical, without performance degradation (epilamization and resistance of epilamization).

What is claimed is:

1. A epilamization method of at least one part of a substrate surface comprising:
   a) preparing an epilame agent, wherein the epilame agent is in the form of a solution in a solvent,
   b) optionally, preparing the substrate surface,
   c) placing the substrate and the epilame agent in a chamber at ambient pressure
   d) introducing $CO_2$ into the hermetically sealed chamber at a pressure comprised between 25 bar and 74 bar and at a temperature comprised between 10° C. and 80° C. for a duration comprised between 1 minute and 30 minutes, the concentration of the epilame agent in the solvent/$CO_2$ mixture being comprised between 10 mg and 5 g per 1000 g of mixture ($CO_2$+solvent),
   e) reducing the pressure in the chamber, and
   f) removing the epilamized substrate from the chamber, wherein the substrate belongs to an element of a timepiece or of a piece of jewelry.

2. The epilamization method according to claim 1, wherein the pressure in the hermetically sealed chamber in d) is comprised between 45 bar and 70 bar.

3. The epilamization method according to claim 2, wherein the pressure in the hermetically sealed chamber in d) is comprised between 50 bar and 60 bar.

4. The epilamization method according to claim 1, wherein the temperature in the hermetically sealed chamber in d) is comprised between 25° C. and 60° C.

5. The epilamization method according to claim 4, wherein the temperature in the hermetically sealed chamber in d) is comprised between 30° C. and 50° C.

6. The epilamization method according to claim 1, wherein the duration of d) is comprised between 1 minute and 20 minutes.

7. The epilamization method according to claim 6, wherein the duration of d) is comprised between 3 minutes and 15 minutes.

8. The epilamization method according to claim 1, wherein the method further comprises, between e) and f), g) heat treating the epilamized substrate.

9. The epilamization method according to claim 1, wherein b) comprises a $CO_2$ treatment at a temperature comprised between 10° C. and 80° C. and a pressure comprised between 25 bar and 250 bar.

10. The epilamization method according to claim 1, wherein the concentration of the epilame agent in the solvent/$CO_2$ mixture is comprised between 50 mg and 1 g per 1000 g of mixture ($CO_2$+solvent).

11. The epilamization method according to claim 10, wherein the concentration of the epilame agent in the solvent/$CO_2$ mixture is comprised between 100 mg and 500 mg per 1000 g of mixture ($CO_2$+solvent).

12. The epilamization method according to claim 1, where the solvent is a fluorinated solvent.

13. The epilamization method according to claim 1, wherein the epilame agent is fluorinated polymer.

14. The epilamization method according to claim 1, wherein the surface of the substrate, at least part of which is coated with the epilame agent, is made of a material chosen from the group consisting of metals, metal oxides, polymers, sapphire, ruby, silicon, silicon oxides, silicon nitrides, silicon carbides, DLC (Diamond like carbon), and alloys thereof.

15. The epilamization method according to claim 1, wherein the substrate belongs to an element of a timepiece.

16. The epilamization method according to claim 1, wherein the substrate belongs to an element of a piece of jewelry.

* * * * *

UNITED STATES PATENT AND TRADEMARK OFFICE
CERTIFICATE OF CORRECTION

PATENT NO. : 10,260,018 B2
APPLICATION NO. : 15/786841
DATED : April 16, 2019
INVENTOR(S) : Claire Rannoux et al.

Page 1 of 1

It is certified that error appears in the above-identified patent and that said Letters Patent is hereby corrected as shown below:

On the Title Page

Column 1, below "Prior publication data" insert -- (30) Foreign Application Priority Data: Oct 25, 2016 (EU) .......... 16195445.8 --.

In the Claims

In Column 6, Line 56, Claim 1, delete "pressure" and insert -- pressure, --.

Signed and Sealed this
Fourteenth Day of April, 2020

Andrei Iancu
*Director of the United States Patent and Trademark Office*